Sept. 6, 1966     R. G. PRIEST     3,271,043
TRAILER SLED WITH RETRACTABLE WHEEL ASSEMBLY
Filed Feb. 24, 1964     3 Sheets-Sheet 2
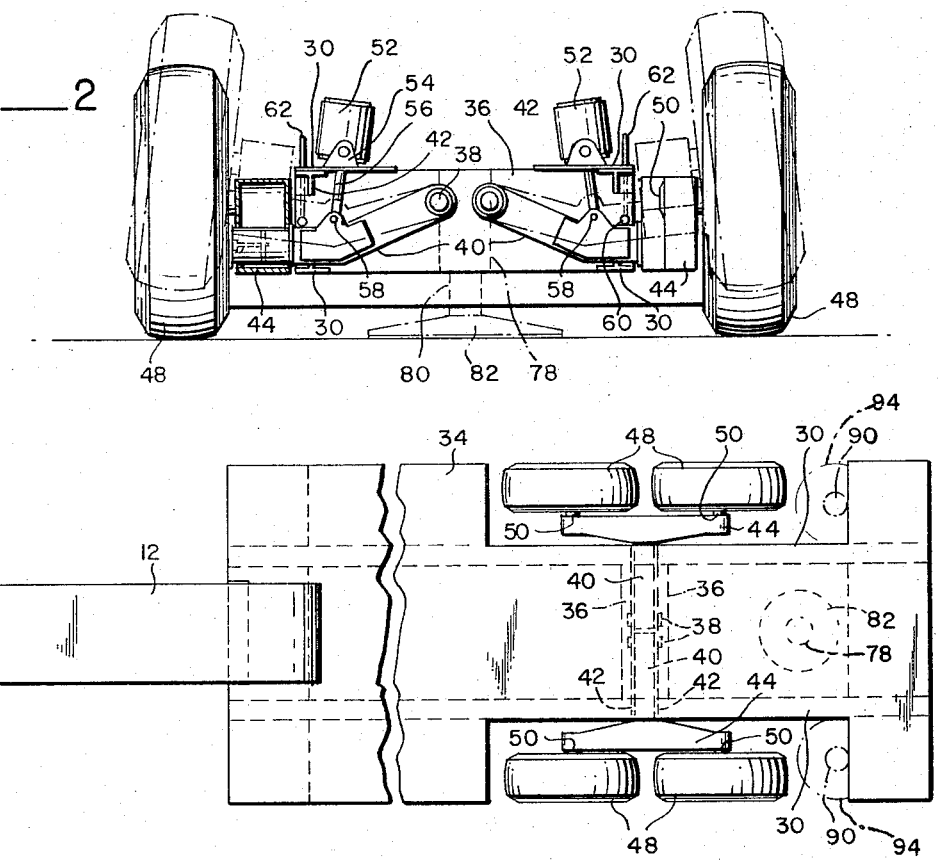
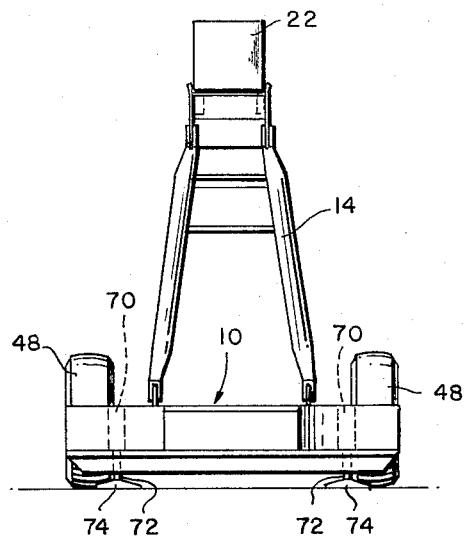
REID G. PRIEST
INVENTOR.
BY Tuck & Cole
ATTORNEYS Sept. 6, 1966   R. G. PRIEST   3,271,043
TRAILER SLED WITH RETRACTABLE WHEEL ASSEMBLY
Filed Feb. 24, 1964   3 Sheets-Sheet 3
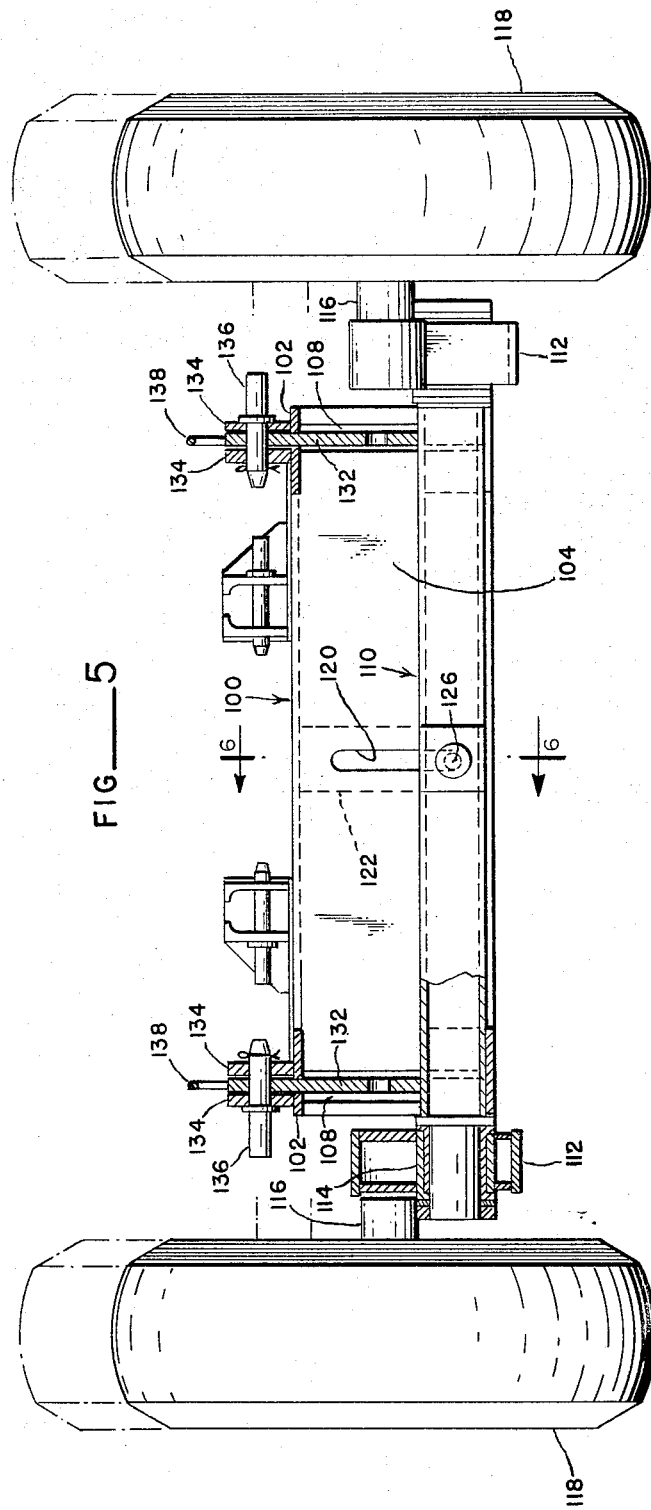
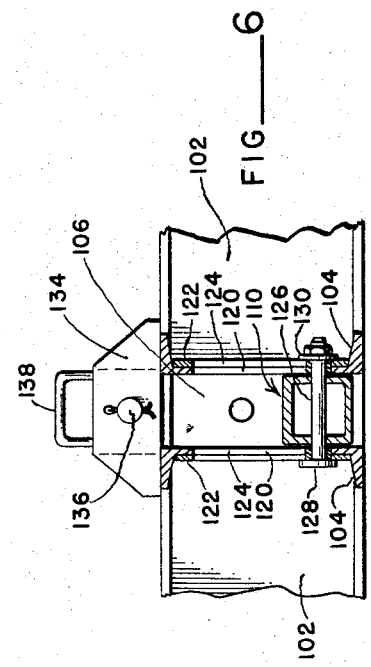
REID G. PRIEST
*INVENTOR.*
BY *Tuck & Cole*
ATTORNEYS

United States Patent Office 3,271,043
Patented Sept. 6, 1966

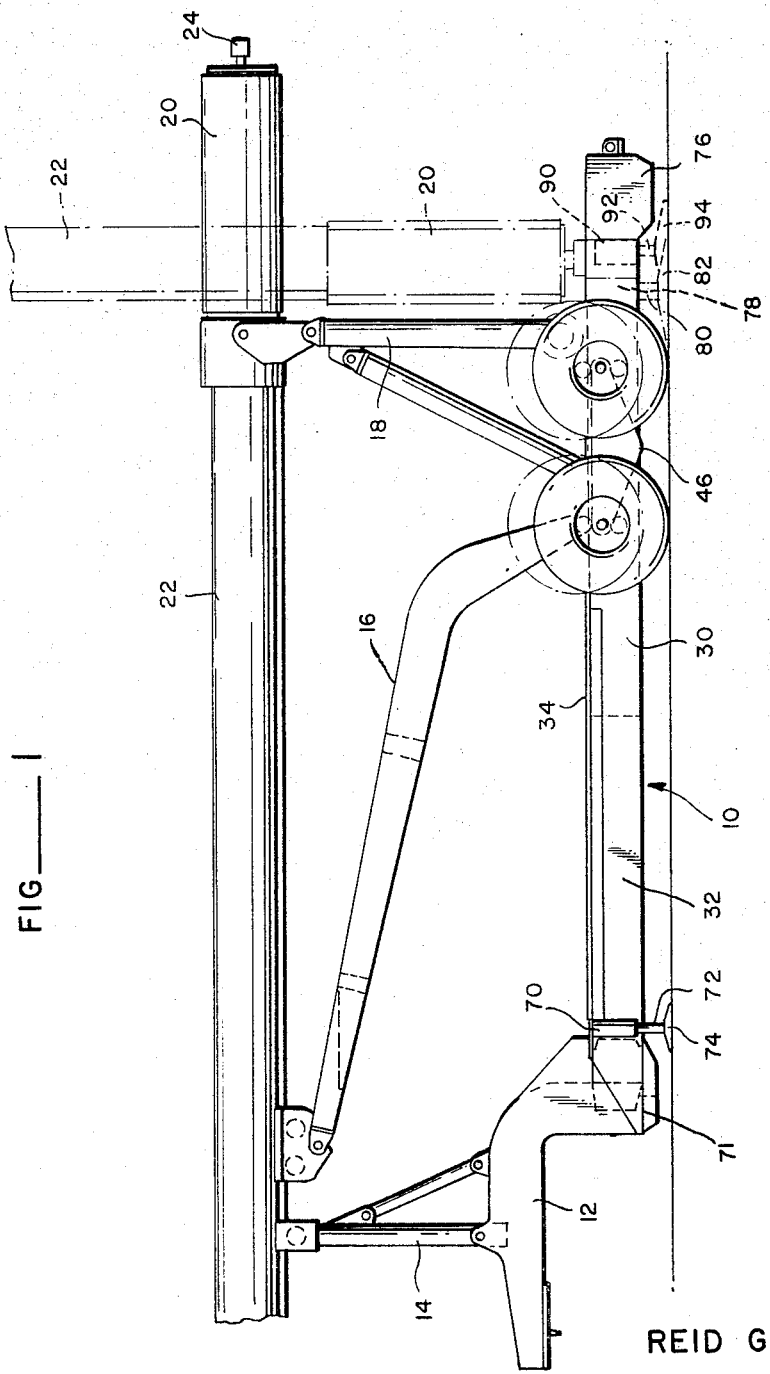

3,271,043
TRAILER SLED WITH RETRACTABLE
WHEEL ASSEMBLY
Reid G. Priest, Port Angeles, Wash., assignor to Hyster Company, Portland, Oreg., a corporation of Nevada
Filed Feb. 24, 1964, Ser. No. 346,712
20 Claims. (Cl. 280—43.23)

This invention relates to new and useful improvements in a base structure for portable or mobile logging spars and more particularly to a trailer-sled structure for a mobile and portable logging spar which is designed to be moved from location to location on wheels and yet which will provide a firm support for the tower.

In the past it was quie common to employ spars trimmed on the spot and reduced to a usable height by topping the tree and then rigging it as a spar. Such an operation, however, required that the tree be in a suitable position which was often very difficult to realize. A great deal of time was devoted to rigging the spar tree while re-rigging also added greatly to the expense. With the advent of portable towers a need has arisen for spar bases or sleds to be built which could be moved rapidly and with as much ease as the towers themselves. In other words, it was necessary that the base or sled become readily transportable in a short period of time and that its position at a particular location be changeable with a minimum of effort and time.

The present invention seeks to overcome the disadvantages of hitherto known portable base structures by providing a trailer-sled which carries its own wheel structure and which allows the wheel structure to be raised and lowered with relation to the trailer-sled to actually transport the base from the location to location. This invention also enables the wheel assemblies to be retracted so that the trailer-sled rests firmly upon the ground, thus providing a firm non-tiltable base or sled structure upon which the tower and yarder can be mounted.

Accordingly, it is a prime feature of this invention to supply a trailer-sled type base for a logging spar which can be moved quickly from one location to another and yet which will provide a firm tower support means.

Another feature of this invention is to provide a trailer-sled base structure for a logging spar which is simple in design, rugged in construction and extremely efficient for rapid relocation and changing of position of a logging spar.

Still another feature of this invention is to provide a trailer-sled base for a portable logging spar which not only permits the base to be moved rapidly from one location to another but which allows for almost instantaneous change of position and direction of the base at any given location.

Yet another object or feature of this invention is to supply a trailer-sled base structure for a portable logging spar which has a new and novel wheel retracting assembly and direction changing pivot means.

A further feature of this invention is to furnish a trailer-sled base structure for a portable logging spar which permits the towing mechanism for the trailer-sled to be removed and the power plant for the yarding operation to be moved onto said base, if said yarder is not permanently mounted on the trailer.

Yet a further feature of this invention is to furnish a trailer-sled base for a portable logging spar which allows the retractable wheel assembly to maintain clearance with the ground where the trailer sled is dropped in order to insure that when the invention is sledded the wheels will not interfere with the sledding operation.

Other objects and advantages will become apparent in the details of the construction and operation as will be more fully hereinafter described and claimed. Reference will be had to the accompanying drawings, forming a part of this disclosure, wherein like numerals refer to like parts, and in which:

FIGURE 1 is a slide elevational view of the trailer-sled base of this invention showing generally how a portable tower would be carried on the base, the towing means, the spar raising structure and other features;

FIGURE 2 is a cross sectional rear elevation view of the trailer-sled showing details of the wheel retracting and locking assembly attached to the trailer;

FIGURE 3 is a top plan view, generally schematic in nature, part of which is broken away, showing how the wheel assembly and towing *tongue* fit into the overall tower base structure;

FIGURE 4 is a front elevational view showing the holding frame and tower in its horizontal position and with the towing *tongue* removed;

FIGURE 5 is a cross section rear elevation view showing details of an alternative wheel raising and lowering structure; and FIGURE 6 is a partial side elevational cross section view taken along the plane 6—6 of FIGURE 5 and showing additional details of the stabilizing pin for the main axle.

Referring now to the drawings and particularly to FIGURE 1 it will be seen that the base generally designated by the number 10 has the detachable towing tongue 12, a spar holding standard 14, raising arm 16, mast 18 and guyline drum structure 20. The spar or tower itself indicated by the number 22 is shown to be in a down position. It has the base pivot means 24.

The base or sled 10 is a flat platform type structure having two spaced generally parallel, longitudinally extending main support beams 30. The support beams have appropriate cross structure (not shown) to form a basic trailer frame structure. A fuel tank as at 32 may be included within the confines of the forward portion of the base structure. A flooring 34 such as two inch planking may be secured to the upper side of the main frame in order to provide a strong platform surface.

One of the features which makes this invention unique is its retractable and extendable wheel structure best shown in FIGURES 2 and 3. A pair of tandem wheel trucks or trunnions supporting the trailer-sled are independently suspended on pivot-type axles. Cross members 36 toward the rear of the trailer extend between the longitudinal frame members 30 and are spaced apart to permit the axle structures 40 for the wheel trunnions to be mounted there-between. The split axle or independent trunnion suspension is provided with two short spaced-apart longitudinally extending axle pivot shafts 38 which are mounted in and between the axle support frame members 36. The inner ends of the axles 40 are pivotably attached to the axle pivot shafts 38. The axles are slightly bent approximately at the mid-point to form what might be described broadly as a slight or wide upward facing V. The axle shafts 38 are located near the top edge of the cross members 36. Hence, the axles 40 must extend slightly downwardly and outwardly and then become generally horizontal approximately at the point at which it begins to extend through the longitudinal frame members 30 in its full down position. It will be seen by reference to FIGURE 2 that the web of each of the longitudinal frame members 30 is provided with an elongated slot 42 through which the axle 40 extends. The dimensions are such as to permit each wheel to have upward and downward movement of about 9 inches.

Located on the outboard side of each of the longitudinal members 30 of the main base frame are wheel mounts or trunnions 44. The wheel mounts or trunnions 44 are generally triangular shaped members of box frame construction in which the apex of the triangle points to the ground. The axles 40 are joined to the wheel mounts 44 by extending completely therethrough as can be seen by reference to the left hand wheel in FIGURE 2. The axles 40 join the wheel mount members 44 approximately in the lower center portion thereof near the apex 46. Each wheel mount 44 has two wheels 48 mounted thereon on shafts 50. The trunnion shafts 50 secured to the wheel mount 44 at each end thereof place said shafts 50 at a higher point from the ground than the axles 40. Each axle 40 is moved about its pivot shaft 38 and within the confines of its slot 42 by virtue of the cylinder 52 secured to the surface of the platform. Cylinders 52 are pivotably mounted on brackets 54. Each cylinder 52 has a piston rod 56 which in turn is pivotably attached as at 58 approximately at the mid point of axle 40 and spaced inwardly from the web of longitudinal member 30. The wheel assemblies may be lowered with respect to the trailer-sled by actuation of piston rods 56 and locked by conventional lock pins 60 operated by hand levers 62 or any other conventional means.

The front end of the trailer-sled structure 10, when not attached by its towing tongue 12 to a tractor or bulldozer may be lifted from its sled 71 by a pair of cylinders 70 having piston rods 72 and pads 74. When the base structure 10 is being used, the locking pins 60 will be disengaged and the wheels raised to permit the trailer-sled 10 to settle onto the sled 76 at the back end of the trailer. Cylinders 70 will lower the front end onto sled 71.

While the following specifications are considered to be non-limiting it has been found that when the wheels are fully extended and in their full down position sled 76 will be approximately 6 inches off the ground. Obviously, this clearance of the sled during movement of the trailer is a matter of choice. When the trailer is resting on its sleds, the wheels in the full up position will clear the ground by about 3 inches. The top of the platform itself is approximately 2½ feet from the ground.

Another unique provision of this invention is a centrally located rear pivot cylinder and pad assembly best shown in FIGURES 1 and 2. The trailer frame is provided near read sled 76 with a large cylinder 78 having piston 80 and pad 82. The primary function of the cylinder 78 is to permit the base structure 10 to be swung about the pad 82 with a minimum of effort. In order to use the cylinder 78 it is only necessary to retract the wheels, extend the piston rod 80 and then by appropriate means attached to the front end of the trailer, such as a bulldozer, merely swing the front end of the base about the pad until it faces in the desired direction.

It must also be recognized that the large centrally located rear cylinder 78 and its pad 82 could be utilized for another purpose. That purpose is to eliminate cylinder means 52 with regard to each of the axles 40. In short, piston rod 80 could be extended in order to take the load off the wheels at which time the locking pin 60 is removed. Then the piston rod 80 will be retracted to permit the platform to settle onto the sled 76. In this way, it is contemplated that the wheels may be raised and lowered either by the positive drive shown and connected to each of the axles or that the positive actuating members could be removed to permit the large central cylinder 78 or the equivalent thereof to operate in the manner just described. When it is desired to drop the wheels to their full down position, it is only necessary to extend the cylinder rod 80 until such time as the axles 40 have settled to the bottom or lower area of slots 42 and the locking pins 60 reengage to lock the wheels in position.

Obviously, cylinders 90 with piston rods 92 and pads 94, one each of which is located outboard of main longitudinal frame members 30 on the front side of rear sled 76 could be used in place of pivot cylinder 78.

FIGURES 5 and 6 show an alternative form of axle structure for the mobile sled unit. The trailer-sled, generally designated by the number 100, has spaced-apart, generally parallel longitudinal main frame members 102 preferably in the form of heavy I-beams, though it will be recognized by those skilled in the art that other structural shapes could also be used. Rearwardly of the longitudinal center line in this embodiment of the trailer sled are located two cross frame members 104 which are spaced-apart just enough to define an elongated axle space 106 extending between the longitudinal main frame members 104. The webs of the frame members 102 are slotted as at 108 to permit the axle, generally shown by number 110, to extend from the outboard side of one member 102 through space 106 and to the outboard side of the opposite member 102. Each end of the axle 110 has bearing bushing to rotatably receive wheel mounts or trunnions 112. Each trunnion 112 has trunnion or wheel shafts 116 on which are mounted the balloon tired wheels 118.

The axle 110 is received within space 106 and slots 108 so that it will move or slide up and down within said slots and said space. The axle is held against lateral movement by a slot and pin principle located generally on the longitudinal center line of the platform. Cross frame members 104 have aligned vertical slots 120 which are reinforced on the outside thereof by reinforcing or backing plates 122 which also have aligned slots 124 aligned with slots 120. The axle, which is preferably of box beam construction, has a center guiding pin 126 extending therethrough in the form of a bolt or equivalent means with head means 128 and a washer and nut 130 for maintaining the pin in position. As can be seen the pin extends entirely through the axle and through the aligned slots thus keeping the axle generally centered but at the same time free to slide up and down as the wheels are either retracted or extended. The platform will continue to be raised by cylinders at each end of the platform as shown in FIGURES 1, 3 and 4. However, it will be recognized that the cylinders for the rear of the platform could be mounted and directly connected to the axle structure of FIGURES 5 and 6 in the same way that cylinders 52 are connected to the axles in FIGURE 2.

Locking of the axle in either its up or down position is accomplished by a square opening cut longitudinally into the top flange of each of the main frame members 102. The openings, not numbered, are provided so that a locking bar 132 may be inserted into the opening and down into the slot 108. On each side of the long dimension of each opening is a heavy locking bracket 134. The brackets are spaced-apart and rigidly secured to the upper surface of the top flange. The brackets, as can be seen, are provided with axially aligned holes to receive locking pins 136. Thus, an unobstructed opening is defined into which is inserted the locking bar 132 which has hand grip 138 to facilitate handling of the bar. Each bar 132 has two positioning holes therein for determining whether the axle is to be held in the up or down position. When the wheels are to be extended, as shown, the various cylinders connected to the platform frame are extended raising the platform and allowing the axle to drop to the bottom of the slot and axle space. The bar 102 is then inserted in its slot until the upper hole is in alignment with the bracket holes, whereupon the locking pin is inserted to hold the axle down.

It will be appreciated that the longitudinal frame members 102 correspond to frame members 30 in the embodiment of the platform set forth in FIGURES 1 to 4. Thus, the other elements shown in FIGURES 1 to 4 are also found in platform 100.

It is felt that the foregoing is illustrative of the principles of this invention. Obviously, numerous modifications and changes will occur to those skilled in the art, and hence it is not desired to limit the invention to the exact construction and operation shown and described. Accordingly, all modifications and equivalents may be resorted to falling within the scope of the invention.

What is claimed is:

1. A mobile trailer-sled for supporting spar towers comprising: (1) a rigid platform having at least two generally parallel spaced apart longitudinal main frame members interconnected by cross frame structure, the forward end of said platform having a front ground engaging sled and a detachable towing tongue, the rear end of said platform having a second ground engaging sled, said platform being provided with a pair of spaced apart axle frame means extending between said longitudinal members generally rearwardly of the transverse center line of said platform and defining an elongated axle space therebetween, and axle openings being provided in said longitudinal members at the ends of said axle space, (2) axle means being provided within said axle space and extending outwardly through said axle openings beyond said longitudinal members to the outboard sides of said platform, said axle means being capable of moving upwardly and downwardly within said axle space and said openings, (3) wheel supporting means attached to the ends of said axle means, said wheel supporting means having rotatable wheels thereon, (4) a plurality of platform raising and lowering means located on said platform for raising and lowering said platform with respect to said wheels, and (5) locking means located near the ends of said axle means for locking said axle means in either one of its up and down positions within said space and openings.

2. The trailer-sled according to the structure of claim 1 and in which said platform raising and lowering means are located at both the rear and front ends of said platform.

3. The trailer-sled according to the structure of claim 1 and in which said platform is provided with a platform pivoting hydraulic cylinder toward its rear end generally midway between the sides thereof for permitting said platform to be swung about said pivoting cylinder when it is desired to change the position of said platform.

4. The trailer-sled according to the structure of claim 1 and in which said platform raising and lowering means are located at both ends of said platform and in which the rear platform raising and lowering means are directly connected to said axle means.

5. A mobile trailer-sled for supporting spar towers comprising: (1) a rigid generally flat platform having at least two generally parallel spaced apart longitudinal main frame members interconnected by cross frame structure, the forward end of said platform having a front ground engaging sled and a detachable towing tongue, the rear end of said platform having a second ground-engaging sled, said platform being provided with a pair of spaced apart axle frame means extending between said longitudinal members generally rearwardly of the transverse center line of said platform and defining an elongated axle space therebetween, and axle openings being provided in said longitudinal members at the ends of said axle space, (2) a retractable wheel structure including axle means provided within said axle space and extending outwardly through said axle openings beyond said longitudinal members to the outboard sides of said platform, said axle means being capable of moving upwardly and downwardly within said axle space and said openings, (3) wheel supporting means attached to the ends of said axle means, said wheel supporting means having rotatable wheels thereon, (4) a plurality of raising and lowering hydraulic cylinders secured on said platform for raising and lowering said platform with respect to said wheels, and (5) locking means located near the ends of said axle means and generally near said openings for locking said axle means in either one of its up or down positions within said space and openings.

6. The trailer-sled according to the structure of claim 5 and in which said hydraulic cylinders are located at both the rear and front ends of said platform, said cylinders having pads connected to the cylinder piston for engaging the ground.

7. The trailer-sled according to the structure of claim 5 and in which said platform is provided with a platform pivoting hydraulic cylinder toward its rear end generally midway between the sides thereof for permitting said platform to be swung about said pivoting cylinder when it is desired to change the position of said platform.

8. The trailer-sled according to the structure of claim 5 and in which said hydraulic cylinders are located at both ends of said platform and in which the rear platform cylinders are directly connected to said axle means.

9. A mobile trailer-sled for supporting spar towers comprising: (1) a rigid generally flat platform having at least two generally parallel spaced apart longitudinal main frame members interconnected by cross frame structure, the forward end of said platform having a first ground-engaging sled and a detachable towing tongue, the rear end of said platform having a second ground-engaging sled, said platform being provided with a pair of spaced apart axle frame means extending between said longitudinal members rearwardly of the transverse center line of said platform and defining an elongated axle space therebetween, and axle openings being provided in said longitudinal members at the ends of said axle space, (2) a retractable wheel structure including axle means provided within said axle space and extending outwardly through said axle openings beyond said longitudinal members to the outboard sides of said platform, said axle means being capable of moving upwardly and downwardly within said axle space and said openings, (3) wheel supporting means attached to the ends of said axle means, said wheel supporting means having rotatable wheels thereon, (4) a plurality of raising and lowering hydraulic cylinders secured at both ends of said platform for raising and lowering said platform with respect to said axle and wheels, (5) locking means located near the ends of said axle means and in close proximity to said openings for locking said axle means in either one of its up or down positions within said openings, (6) said first and second sled means being positioned on said platform so that they are a predetermined distance off the ground when said wheel structure is extended.

10. The trailer-sled according to the structure of claim 9 and in which said hydraulic cylinders are located at both the rear and front ends of said platform, said cylinders having pads connected to the cylinder piston for engaging the ground.

11. The trailer-sled according to the structure of claim 9 and in which said platform is provided with a platform pivoting hydraulic cylinder toward its rear end generally midway between the sides thereof for permitting said platform to be swung about said pivoting cylinder when it is desired to change the position of said platform.

12. The trailer-sled according to the structure of claim 9 and in which said hydraulic cylinders are located at both ends of said platform and in which the rear platform cylinders are directly connected to said axle means.

13. A mobile trailer-sled for supporting spar towers comprising: (1) a rigid generally flat platform having at least two generally parallel spaced-apart longitudinal main frame members interconnected by cross frame structure, the forward end of said platform having a first ground engaging sled and a detachable towing tongue, the rear end of said platform having a second ground engaging sled, said platform being provided with a pair of spaced apart axle frame means extending between said longitudinal members rearwardly of the transverse center line of said platform and defining an elongated axle space therebetween, and axle openings being provided in said longitudinal members at the ends of said axle space, (2) a pair of axle means being provided within said axle space with the outer ends thereof extending outwardly beyond said longitudinal members to the outboard sides of said platform, the inner ends of said axle means being pivotally mounted on axle support shaft means extending between and secured to said axle frame means, said axle means being capable of pivotally moving upwardly and downwardly within said axle space and said openings, (3) wheel supporting means attached to the outer ends of said axle means, said wheel supporting means having rotatable wheels thereon, (4) a plurality of raising and lowering means located on said platform for raising and lowering said platform with respect to said wheels, and (5) locking means located near the ends of said axle means for locking said axle means in either one of its up or down positions within said slots.

14. The trailer-sled according to the structure of claim 13 and in which said platform raising and lowering means are located at both the rear and front ends of said platform.

15. The trailer-sled according to the structure of claim 13 and in which said platform is provided with a platform pivoting hydraulic cylinder toward its rear end generally midway between the sides thereof for permitting said platform to be swung about said pivoting cylinder when it is desired to change the position of said platform.

16. The trailer-sled according to the structure of claim 13 and in which said platform raising and lowering means are located at both ends of said platform and in which the rear platform raising and lowering means are directly connected to said axle means.

17. A mobile trailer-sled for supporting spar towers comprising: (1) a rigid generally flat platform having at least two generally parallel spaced-apart longitudinal main frame members interconnected by cross frame structure, the forward end of said platform having a first ground engaging sled and a detachable towing tongue, the rear end of said platform having a second ground engaging sled, said platform being provided with a pair of spaced apart axle frame means extending between said longitudinal members rearwardly of the transverse center line of said platform and defining an elongated axle space therebetween, and axle openings being provided in said longitudinal members at the ends of said axle space, (2) a pair of axle means being provided within said axle space with the outer ends thereof extending outwardly beyond said longitudinal members to the outboard sides of said platform, the inner ends of said axle means being pivotally mounted on spaced-apart axle support shafts extending between and secured to said axle frame means, said axle means being capable of pivotally moving upwardly and downwardly within said axle space and said openings, (3) wheel supporting means attached to the outer ends of said axle means, said wheel supporting means having rotatable wheels thereon, (4) a plurality of platform raising and lowering hydraulic cylinders secured at both ends of said platform for raising and lowering said platform with respect to said axle and wheels, and (5) locking means located near the ends of said axle means and in close proximity to said openings for locking said axle means in either one of its up or down positions within said openings.

18. The trailer-sled according to the structure of claim 17 and in which said hydraulic cylinders are located at both the rear and front ends of said platform, said cylinders having pads connected to the cylinder piston for engaging the ground.

19. The trailer-sled according to the structure of claim 17 and in which said platform is provided with a platform pivoting hydraulic cylinder toward its rear end generally midway between the sides thereof for permitting said platform to be swung about said pivoting cylinder when it is desired to change the position of said platform.

20. The trailer-sled according to the structure of claim 17 and in which said hydraulic cylinders are located at both ends of said platform and in which the rear platform cylinders are directly connected to said axle means.

References Cited by the Examiner
UNITED STATES PATENTS

| | | | |
|---|---|---|---|
| 832,628 | 10/1906 | Schreffler | 280—43 X |
| 2,387,504 | 10/1945 | Farr | 280—43.23 |
| 2,459,753 | 1/1949 | Brown | 280—43.23 X |
| 3,003,780 | 10/1961 | Lundahl | 280—43 |

BENJAMIN HERSH, *Primary Examiner.*

C. C. PARSONS, *Assistant Examiner.*